United States Patent

Vairogs

[15] 3,648,713

[45] Mar. 14, 1972

[54] PIPELINE TRANSPORTATION

[72] Inventor: Juris Vairogs, Tulsa, Okla.

[73] Assignee: Cities Service Oil Company

[22] Filed: Feb. 24, 1970

[21] Appl. No.: 13,344

[52] U.S. Cl. ..................................................137/1, 137/15
[51] Int. Cl. ..........................................................F17d 3/02
[58] Field of Search ....................137/13, 1; 252/8.3, 8.55, 15

[56] References Cited

UNITED STATES PATENTS

| | | | |
|---|---|---|---|
| 2,953,146 | 9/1960 | Gordon | 137/1 |
| 3,389,714 | 6/1968 | Hughes | 137/13 |
| 3,198,201 | 8/1965 | Every | 137/1 |
| 3,396,107 | 8/1968 | Hill | 252/8.55 |

*Primary Examiner*—Alan Cohan
*Attorney*—J. Richard Geaman

[57] ABSTRACT

Carbon dioxide is injected into a surface pipeline to maintain a pressure near that required to form a two two-liquid phase hydrocarbon-carbon dioxide system. The two-liquid phase region is placed as a slug between two hydrocarbons to be transported within the pipeline. The two-liquid phase slug prevents the mixing of the hydrocarbons being pipelined. The slug material exhibits a lower viscosity than the flowing hydrocarbons so that it flows in the turbulent regime causing a cleansing action in the pipeline and also reducing the extend of its own tailing. Upon effluence from the pipeline the carbon dioxide may be vented to the atmosphere to separate it from the hydrocarbons.

14 Claims, 2 Drawing Figures

Patented March 14, 1972

JURIS VAIROGS,
INVENTOR.

BY J Richard Geaman

ATTORNEY.

JURIS VAIROGS,
INVENTOR.

PIPELINE TRANSPORTATION

BACKGROUND OF THE INVENTION

This invention relates to the separation of hydrocarbons within pipelines. More particularly it relates to the separation of hydrocarbons by the formation of a slug therebetween consisting of a miscible gas dissolved in one or more hydrocarbons under conditions of pressure and temperature so as to form two liquid phases.

It is common practice in operating pipelines to pump large quantities of fluids called "batches", "slugs" or "tenders" successively and in the same direction through a given pipeline. Each of the individual slugs or tenders may range in volume from several hundred barrels to more than 100,000 barrels, and may be transported many miles and even many hundred miles from the source. Tenders originate at a terminal and are pumped several hundred miles to a refinery where the crude oils are processed to produce various desired products, such as gasoline, kerosene, and lubricating oils. In most cases the flow of these crude petroleum oils, particularly of the relatively viscous ones, is by stream-lined or laminar flow. This is the type flow in which liquid is "telescoping" or transported in a bullet-shaped manner through the tube. Each fluid layer moves faster than the one adjacent to it and nearer the wall of the tube, the fastest motion being at the center of the tube, and the slowest movement of liquid being in the immediate proximity of the wall. Over extensive distances in a pipeline a central portion of the flowing fluid may extend itself through an intermediate material and into the material ahead of it. In an opposite manner, the material ahead of the intermediate material clings to the walls of the pipeline and contaminates subsequent fluids which contact the coated walls.

What is required is a method for separating flowing fluids from each other by a slug which will remain separate and distinct from the fluids flowing in a pipeline, and be readily retrievable from the fluids as they exit from the pipeline. Gordon, U.S. Pat. No. 2,953,146 represents one method for the separation of hydrocarbons in pipelines. In the process of Gordon, the two fluids are transported as relatively viscous oils through a pipeline by a process which includes introducing a first viscous oil into the pipeline and conveying it through the pipeline at a rate such that its flow therethrough is substantially laminar. The second step in the process is the introducing and conveying through said pipeline, behind the first viscous oil, a volume of an oil with a relatively low viscosity such that at the transport conditions in the pipeline the low viscosity oil will flow in a truly turbulent state. The third step comprises the introduction of a second viscous oil behind the turbulent flowing low viscosity oil and the conveying of the second oil therethrough. The Gordon patent then teaches the use of single phase miscible fluids flowing in the turbulent regime between two laminar flow viscous oils. The inherent difficulty with Gordon is that over large distances a tremendous amount of the light oil in turbulent flow may be required to separate the heavy crude oils. Additionally upon exit of the heavy crude oils and interface of light oil in the turbulent flow regime there must be a distillation or separating process. The process is fairly complex and a significant amount of valuable stock may be lost due to contamination by the light oil.

It is an object of this invention to provide a method for segregating hydrocarbons flowing in pipelines.

It is another object of this invention to prevent the intermingling of hydrocarbons flowing in the pipeline.

It is still a further object of the present invention to utilize the unique phase behavior of miscible gases to overcome the phenomena of hydrocarbons intermingling within pipelines and for separating the intermediary material at the exit portion of the pipeline.

With these and other objects in mind, the present invention is hereinafter set forth with reference to the following drawings and description.

SUMMARY OF THE INVENTION

The objects of the present invention are accomplished by a process for transporting two different hydrocarbon materials through a pipeline which comprises introducing a first hydrocarbon into the pipeline and conveying it through the pipeline. Secondly, introducing a slug of material capable of supporting a two-phase liquid equilibrium and conveying it through the pipeline behind the first hydrocarbon. Thirdly, introducing the second of said hydrocarbons into the pipeline behind the slug and conveying it therethrough the pipeline. The process is most conveniently conducted by use of a slug of a carbon dioxide-crude oil mixture to separate two different hydrocarbon crude oils. The process includes the use of a dead crude oil mixed with a miscible gas such as carbon dioxide to form the slug. A permissible embodiment of the invention is to convey the two hydrocarbon fluids and the slug at flow rate conditions so that the hydrocarbons flow in the laminar flow regime and the less viscous carbon dioxide-hydrocarbon mixture flows in the turbulent flow regime. Another embodiment of the process is to exit the material from the pipeline at a pressure sufficient to release the miscible gas contained therein and thereby uncontaminate the hydrocarbons transported. There also may be the necessity, with the use of carbon dioxide, to introduce corrosion inhibitor in the slug to inhibit pipeline damage.

The present process may comprise the introduction of a slug of miscible gas. Conditions of pressure and temperature within said pipeline are so maintained that the miscible gas dissolves hydrocarbons within the pipeline. As the miscible gas is driven through the pipeline an appreciable buildup of hydrocarbon is dissolved within said miscible gas, the miscible gas-hydrocarbon system then exhibits a two phase liquid system. At the exit of the pipeline the miscible gas may have dissolved enough hydrocarbon from the leading hydrocarbon front and from the tailing of the hydrocarbon front ahead of the miscible gas slug to form a two-phase liquid equilibrium and thereby further segregate the hydrocarbon materials from each other. Addition of corrosion inhibitors maintaining laminar flow of the hydrocarbon materials and turbulent flow of the slug are also desirable with this invention embodiment.

BRIEF DESCRIPTION OF THE DRAWINGS

The present invention is hereinafter described in further detail with particular reference to the accompanying drawings.

DETAILED DESCRIPTION OF THE INVENTION

I have found the present invention to be particularly applicable through the use of a miscible gas as a slug injected intermediate between two hydrocarbons being transported within a pipeline. The invention consists of injecting a slug of miscible gas or a slug of miscible gas-hydrocarbon mixture in the intermediate zone between two hydrocarbons being pipelined. As a first hydrocarbon enters a pipeline and flows therethrough it may leave tailing effects as evidenced by contamination of pipeline walls and equipment. If a slug of miscible gas or a miscible gas-hydrocarbon mixture is conducted through the pipeline it tends to dissolve and pick up the residual hydrocarbon left behind from the first hydrocarbon conveyed therethrough. In addition, as the second hydrocarbon is introduced behind the slug, the slug tends to segregate the second hydrocarbon from advancing and intermingling with the first hydrocarbon introduced within the pipeline. Therefore, the slug has a twofold purpose in that it exhibits a cleansing action, which removes contaminated fluids which have passed before the slug in the pipeline, and also a segregating action, as the slug decreases the intermingling of the two hydrocarbons as they flow through the pipeline.

Figure 1:
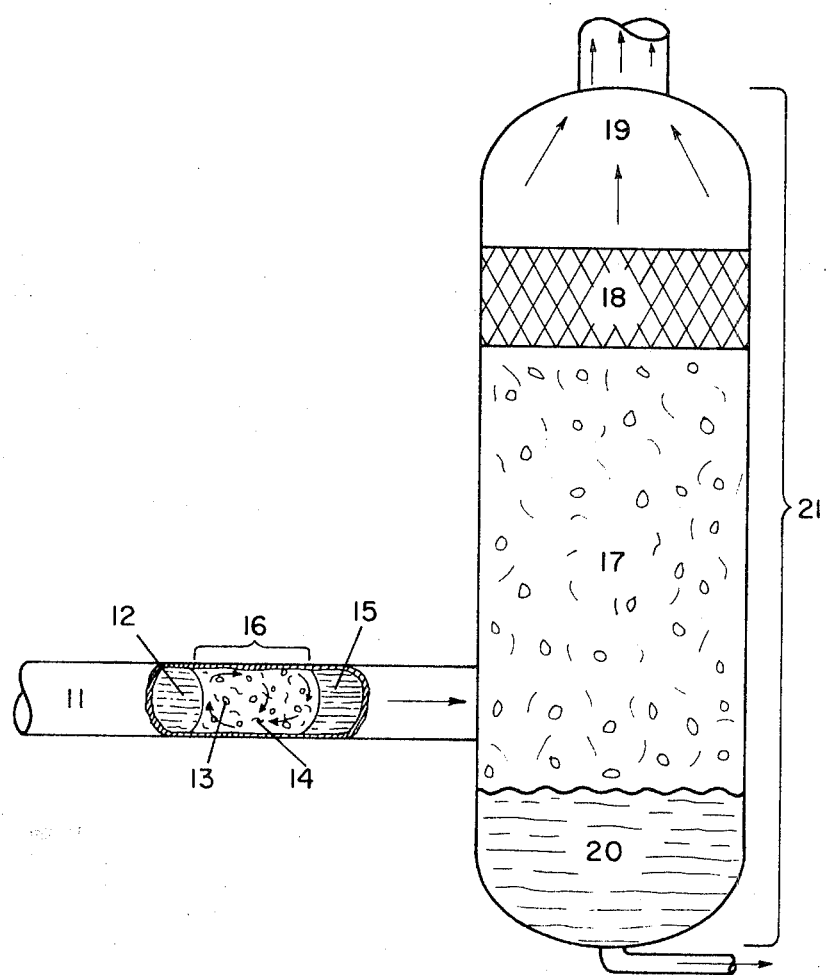
FIG. 1 represents a cross-sectional view of a pipeline with the process of the present invention depicted therein.

An embodiment of the present invention is illustrated by referral to FIG. 1. Pipeline 11 contains hydrocarbon 12 and 15, which are of different material makeup, and are flowing within pipeline 11 and separated by slug 16. Slug 16 comprises miscible gas 14 and hydrocarbon material 13 which may be added at the inlet to form a two-phase liquid region as depicted in FIG. 1, or may be the result of cleansing of the walls of the pipeline. Hydrocarbon material 13 is then made up of hydrocarbon 15 resulting from wall cleansing and also of hydrocarbon 12 resulting from segregation of the second hydrocarbon. Also depicted in FIG. 1 is flash means 21 shown at the exit portion of the pipeline. Hydrocarbon 12 and 15, with intermediate slug 16, flow into the flash chamber 17 and material separates into hydrocarbon fraction 20, exiting from the bottom of the separation means, and carbon dioxide and hydrocarbon mist. The mist is broken by entrainment means 18 so that the miscible gas 19 is exited at the upper portion of the segregation equipment.

In the commercial transportation of different hydrocarbon materials, wherein the contamination thereof will prevent an economic utilization of the full hydrocarbon slug introduced into the pipeline, the hydrocarbons may be separated by introduction of a miscible gas therebetween. The miscible gas is maintained throughout the pipeline length at a temperature and pressure sufficient to form a two-phase liquid region either at the inlet portion of the pipeline by adding a hydrocarbon material or at some distance from the inlet portion of pipeline by the cleansing and segregation action of the miscible gas slug. The miscible gas slug will thereby segregate and cleanse the pipeline throughout its length and at the exit be easily recovered therefrom by a flashing technique. The flashing technique requires nothing more than lowering the pressure at the exit of the pipeline, thereby releasing the carbon dioxide gas from the two-phase liquid region.

The preferred embodiment of FIG. 1 also depicts the hydrocarbon fluids 12 and 15 flowing in the laminar regime, that is the fluid flowing with the Reynolds number in the neighborhood of about 800 to 2,000. The preferred transport of the miscible slug flowing in the turbulent regime, which would usually be the result of a Reynolds number namely from as high as 4,000 to above 10,000, is also related. The turbulent flow is the result of lower viscosity of the miscible gas-hydrocarbon mixture contained within the slug. The turbulent flow of slug region 16 exhibits an eddy effect which will scour the walls of the pipeline. The scouring cleanses the hydrocarbon material left behind from hydrocarbon 15 and also retards the advancing laminar front of flowing hydrocarbon 12, thus segregating the two hydrocarbons within the pipeline.

Although most miscible gases will exhibit a two-phase liquid region with hydrocarbon crude oils under suitable conditions of temperature and pressure, carbon dioxide, ethane and combinations thereof have been found most effective and useful with most crude oils. Therefore, it is preferred to use carbon dioxide, ethane and mixtures thereof, in practicing the present invention. The presence of other gases, for instance air, nitrogen or carbon monoxide in contamination quantities up to 20 percent impurities will not limit the usefulness of the miscible gas in the present process. However, since small amounts of the miscible gas are being used to segregate the hydrocarbons flowing within the pipeline, it is preferred to use relatively pure gas such as to reduce the amount of the contaminating material to about 5 percent impurities flowing within the pipeline.

To more fully understand the application of the process described herein the present invention is illustrated by the following example:

EXAMPLE

Figure 2:
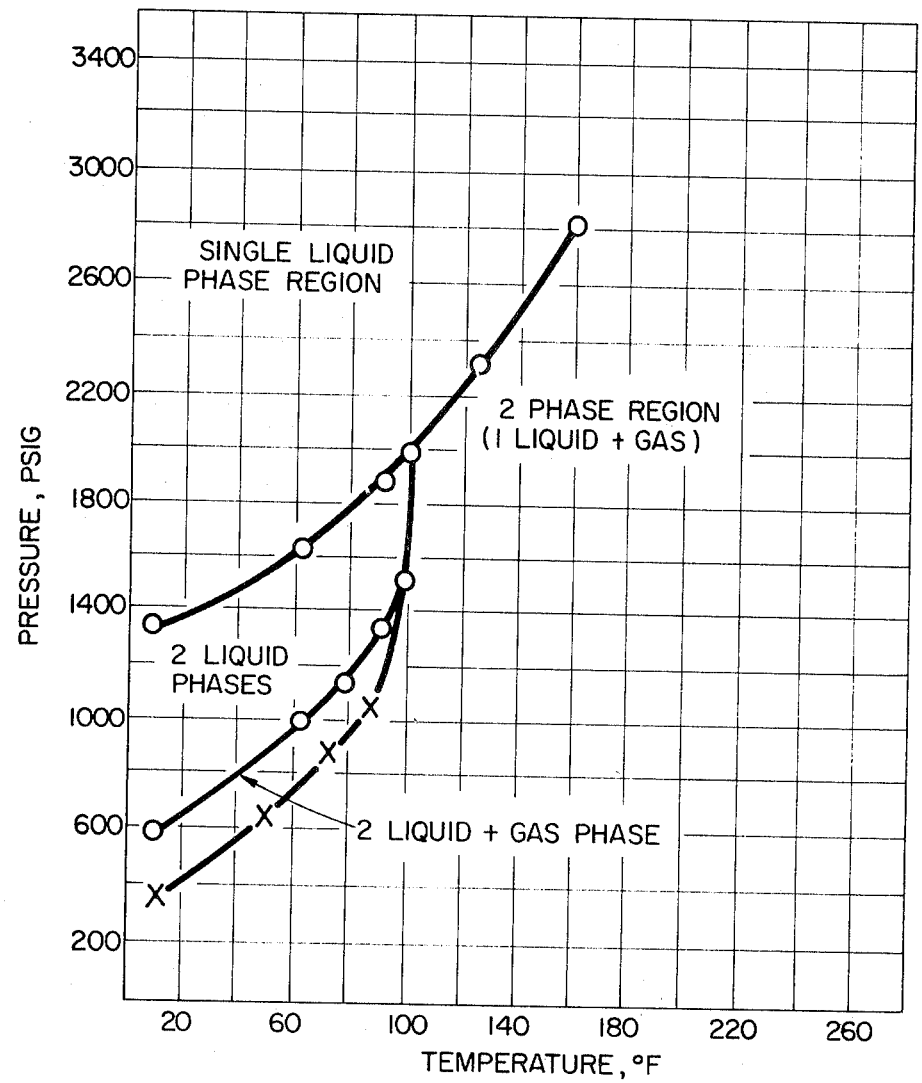
FIG. 2 represents the applicable regions in which the present invention may be used with a sample crude oil at various conditions of pressure and temperature.

Crude oil obtained by the bottomhole sampling of a production well was analyzed to have an average molecular weight of 110 and utilized as the reservoir oil in this study. A 250 cubic centimeter, high pressure windowed equilibrium cell, through which phase behavior could be studied visually, was charged with the crude oil. Varying amounts of carbon dioxide were introduced into the cell to observe the phase behavior of the carbon dioxide — crude oil system. The mixture phase system was studied over a range of temperature from 10° to 160° F. in a range of pressures from 200 to 2,800 p.s.i.g. FIG. 2 depicts the two-phase liquid region which was found to exist between the temperatures of 10° to about 110° F. and pressures from about 550 to 2,000 p.s.i.g. Therefore, the two-phase liquid relationship was found to exist over a wide range of temperatures and pressures which may be exhibited within a pipeline.

The above example shows the application of introducing a miscible gas, for example carbon dioxide, as a main constituent to segregate two hydrocarbon materials. The slug may be used at the pipeline pressures and temperatures normally encountered in pipeline operations. Thus, one need merely introduce and maintain the miscible gas slug within the two-liquid phase region. Fluctuations of pressure are permissible as long as the pressure stays within the pressure limits defined by the two-liquid phase envelope. Since the temperature of the fluids contained within the pipeline generally remains within a temperature range of the two-liquid phase envelope no temperature control is required to form the two-liquid phase region. Pipeline temperatures of 40° to 200° F. are preferred.

As previously mentioned, the slug may be created by injecting liquid carbon dioxide between the two fluids to be pipelined if the pipeline temperature and pressure allow the aforementioned conditions to exist. As the slug moves within the pipeline it will dissolve the hydrocarbons left behind from the leading hydrocarbon front. After sufficient amounts of hydrocarbon have been dissolved two partially immiscible liquid phases will form. As long as the pressure can be maintained within the two-phase liquid envelope no gaseous phase will evolve. Pressures up the saturation pressure of carbon dioxide in the hydrocarbon are desirable with about 2,000 p.s.i.a. as the maximum allowable pipeline pressure. At the exit of the pipeline the pressure on the effluent is released, allowing the carbon dioxide to escape. It may be a criterion of the pipelining operation to have exact segregation from inlet to exit of the pipeline. In shorter runs, say in the neighborhood of several miles to 50 miles or less, a miscible gas-hydrocarbon mixture is injected at the inlet to immediately form the two-liquid phase region to segregate the hydrocarbons being transported. Generally, a concentration of 0.2 to 0.6 mole fraction carbon dioxide in the slug is required. It has been found through experimental study that a "live" crude oil, that is a crude oil which naturally has a high solution gas-oil ratio content, requires a relatively high pressure to form the two liquid phases. If some or all of the solution gas is removed the two-liquid phase phenomenon is found to occur at much lower pressures which may be tolerated in a pipeline operation. For example, as shown in FIG. 2, a live crude oil containing a substantial amount of solution gas was utilized. It was found through further studies that by releasing the solution gas from the crude oil pressures in the range of 100 to 1,100 p.s.i.g. could be used to form a two-liquid phase envelope. Thus, with a favorable pipeline temperature, the pressure needed to maintain a liquid slug will be within the range of practical pipeline pressures. Similar results have been found using ethane and carbon dioxide-ethane mixtures.

As mentioned, it is a preferred embodiment of the invention to have the hydrocarbon materials flow within the laminar flow regime to form distinct boundary regions. It is also a preferred embodiment of the invention to cause the miscible slug intermediate between the two hydrocarbon materials and also less viscous than the two hydrocarbon materials flowing ahead and behind the miscible slug to flow within the turbulent flow regime. By adjusting the rate of conveyance of the materials within the pipeline one may cause the hydrocarbon materials to flow in the laminar flow regime, thus forming distinct boundaries between the hydrocarbon materials and the slug. Simultaneously the slug may be caused to flow in the turbulent remine exhibiting a cleansing action and also reduces the extent of its own tailing and contamination of the second hydrocarbon material flowing in the pipe.

In the application of carbon dioxide as the miscible gas or a carbon dioxide-ethane mixture to separate the hydrocarbon materials, the effect of carbon dioxide corrosion of the pipeline must be considered. Carbon dioxide corrosion may be readily inhibited by the addition of a carbon dioxide-corrosion inhibitor. Various and sundry suitable corrosion inhibitors have been described in the literature. It is suitable to use any corrosion inhibitor which may be readily dissolved within the intermediate miscible slug and is both economic and retrievable at the exit portion of the pipeline.

By use of the miscible slug process for segregating and cleansing pipelines as described herein the present miscible gas process is applicable to most pipeline situations and hydrocarbon materials generally transported. Recovery of the hydrocarbon material at the pipeline exit is enhanced by the dissolution of the carbon dioxide from the hydrocarbon materials and from the intermediate miscible gas-hydrocarbon two-liquid phase region. The hydrocarbon recovered is essentially uncontaminated and is readily transferred for ultimate use with little of the hydrocarbon material being intermingled with those materials ahead and behind it in the pipeline. The field of pipelining is enhanced by this process for the segregation and cleansing of pipelines.

The invention that has been described herein with respect to particular embodiments and aspects thereof. It will be appreciated, however, by those skilled in the art that various changes and modifications can be made, however, without departing from the scope of the invention.

Therefore, I claim:

1. A process for transporting two different hydrocarbon materials through a pipeline, which comprises:
   a. introducing the first of said hydrocarbons into and conveying it through said pipeline;
   b. introducing a slug of material, having a miscible gas therein capable of supporting a two-phase liquid equilibrium, and conveying it through said pipeline behind the first hydrocarbon;
   c. introducing the second of said hydrocarbons into the pipeline behind the slug and conveying it therethrough said pipeline; and
   d. maintaining conditions of temperature and pressure within said pipeline so that a two-phase liquid equilibrium is exhibited by said slug.

2. The process of claim 1 in which said two different hydrocarbons are crude oils.

3. The process of claim 1 in which the first hydrocarbon, slug and second hydrocarbon are conveyed at a rate such that the first and second hydrocarbons are flowing in the laminar regime.

4. The process of claim 3 in which the first and second hydrocarbons are more viscous than the slug and are conveyed at such a rate that the slug is flowing in the turbulent regime.

5. The process of claim 1 in which said miscible gas is carbon dioxide.

6. The process of claim 5 further comprising introducing a carbon dioxide corrosion inhibitor into the slug to inhibit pipeline damage.

7. The process of claim 5 in which said slug also contains a mixture hydrocarbon.

8. The process of claim 7 in which the temperature of the pipeline is maintained between about 40° to 200° F.

9. The process of claim 8 further comprising reducing the pressure on the first hydrocarbon, slug and second hydrocarbon as they exit from the pipeline releasing the miscible gas contained therein.

10. The process of claim 7 in which said mixture hydrocarbon is one of said crude oils.

11. The process of claim 10 in which said crude oil used as the mixture hydrocarbon has had all of its solution gas removed.

12. The process of claim 7 in which the pressure of the pipeline is maintained up to the saturation of carbon dioxide in the mixture hydrocarbon.

13. The process of claim 12 in which the pressure is less than about 2,000 p.s.i.a.

14. The process of claim 9 in which the carbon dioxide concentration of the slug is between 0.2 to 0.6 mole fraction.

* * * * *